(12) United States Patent
Videen

(10) Patent No.: US 7,701,638 B2
(45) Date of Patent: Apr. 20, 2010

(54) SPHERICALLY SHAPED OPTICAL BEAMSPLITTER

(75) Inventor: Gorden Videen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 4 days.

(21) Appl. No.: 12/022,313

(22) Filed: Jan. 30, 2008

(65) Prior Publication Data

US 2009/0190229 A1 Jul. 30, 2009

(51) Int. Cl.
*G02B 27/14* (2006.01)
*G01N 21/00* (2006.01)

(52) U.S. Cl. .................. 359/629; 356/342; 356/338; 356/337

(58) Field of Classification Search .......... 356/338, 356/339, 340, 342; 359/629, 634, 637
See application file for complete search history.

(56) References Cited

U.S. PATENT DOCUMENTS

| 4,290,667 | A | * | 9/1981 | Chown | 385/33 |
|---|---|---|---|---|---|
| 4,770,529 | A | | 9/1988 | Levinson et al. | 356/153 |
| 5,028,119 | A | | 7/1991 | Hegg et al. | 350/174 |
| 5,060,063 | A | | 10/1991 | Freeman | 358/101 |
| 6,052,187 | A | | 4/2000 | Krishnan et al. | 356/364 |
| 6,097,488 | A | | 8/2000 | Grek et al. | 356/364 |
| 6,124,928 | A | | 9/2000 | Slater | 356/317 |
| 6,138,083 | A | | 10/2000 | Videen | 702/155 |
| 6,163,408 | A | | 12/2000 | Larussa | 359/630 |
| 6,239,873 | B1 | | 5/2001 | Videen | 356/369 |
| 6,411,441 | B1 | | 6/2002 | Videen | 359/631 |
| 6,414,797 | B1 | | 7/2002 | Videen | 359/631 |
| 2007/0103788 | A1 | | 5/2007 | Magarill et al. | |
| 2009/0190230 | A1 | | 7/2009 | Videen | |

FOREIGN PATENT DOCUMENTS

| EP | 1283429 | | 2/2003 |
|---|---|---|---|
| JP | 2005181000 | A * | 7/2005 |

OTHER PUBLICATIONS

English-language translation of JP 2005-181000 A (computer translation obtained through Japanese Industrial Property Digital Library (IPDL) website; http://www.ipdl.inpit.go.jp/homepg_e.ipdl (May 30, 2009).*

Patent Application filed Nov. 6, 2000, assigned U.S. Appl. No. 09/707,291 and entitled Wide-Angle Backscatter Probe Having a Rotatable Beamsplitter and Method of Measuring With Same.

(Continued)

*Primary Examiner*—David N Spector
(74) *Attorney, Agent, or Firm*—William R. Randolph; Christos Kyriakou

(57) ABSTRACT

A rotatable optical beamsplitter comprises an optically-transparent material and a partially-reflective layer. The optically-transparent material has a unitary spherical exterior surface. The partially-reflective layer is located at least partially within the optically transparent material. The spherically shaped optical beamsplitter demonstrates reduced optical distortion.

17 Claims, 3 Drawing Sheets

OTHER PUBLICATIONS

Yu. G. Shkuratov, M.A. Kreslavsky, A.A. Ovcharenko, D.G. Stankevich, and E.S. Zubko; Opposition Effect from Clementine Data and Mechanisms of Backscatter; 1999; pp. 132-155.

Vera K. Rosenbush, Viktor V. Avramchuk, and Aleksandr E. Rosenbush; Polarization Properties of the Galilean Satellites of Jupiter: Observations and Preliminary Analysis; Sep. 20, 1977; pp. 402-414.

Karri Muinonen; Coherent Backscattering by Solar System Dust Particles; 1993; pp. 271-296.

Yu. Shkuratov, A. Ovcharenko, and E. Zubko, O. Miloslavskaya, K. Muinonen, J. Piironen, R. Nelson, W. Smythe, V. Rosenbush, and P. Helfenstein; The Opposition Effect and Negative Polarization of Structural Analogs for Planetary Regoliths; 2002; pp. 396-416.

Michael I. Mishchenko; On the Nature of the Polarization Opposition Effect Exhibited by Saturn's Rings; The Astrophysical Journal; Jul. 1, 1993; pp. 351-361.

M. I. Mishchenko; Polarization Effects in Weak Localization of Light: Calculation of the Copolarized and Depolarized Backscattering Enhancement Factors; Physical Review B; Dec. 1991; pp. 597-600.

M. I. Mishchenko; Enhanced Backscattering of Polarized Light from Discrete Random Media: Calculations in Exactly the Backscattering Direction; J. Opt. Soc. Am. A/vol. 9, No. 6/ Jun. 1992; pp. 978-982.

M. I. Mishchenko, Jean-Marc Luck, and Theo M. Nieuwenhuizen; Full Angular Profile of the Coherent Polarization Opposition Effect; J. Opt. Soc. Am. A/vol. 17, No, 5/May 2000; pp. 888-891.

Ismo V. Lindell, Ari H. Sihvolva, Karri O. Muinonen, and Peter W. Barber; Scattering By a Small Object Close to an Interface; J. Opt. Soc. Am. A/vol. 8, No. 3/Mar. 1991; pp. 472-476.

K. O. Muinonen; A.H. Sihvola; I.V. Lindell; and K.A. Lumme; Scattering by a Small Object Close to an Interface; J. Opt. Soc. Am. A/vol. 8, No. 3/Mar. 1991; pp. 477-482.

Karri Muinonen; Coherent Backscattering by Absorbing and Scattering Media; Sixth Conference on Light Scattering by Nonspherical Particles; pp. 223-226.

J.E. Geak and M. Geake; A Remote-Sensing Method for Sub-Wavelength Grains on Planetary Surfaces by Optical Polarimetry; Mon. Nat. R. astr. Soc. (1990) 46-55.

Milo Wolff; Polarization of Light Reflected From Rough Planetary Surface; Applied Optics; Jun. 1975; pp. 1395-1405.

K. Muinonen, M Kokko, S. Pohjolainen; and P. Hakala; Proceedings of the Finnish Astronomical Society; Observatory and Astrophysics Laboratory, University of Helsinki; 1990; pp. 12-15.

Nadia T. Zakharova and Michael I. Mishchenko; Scattering Properties of Needlelike and Platelike Ice Spheriods With Moderate Size Parameters; Applied Optics/vol. 39, No. 27/ Sep. 20, 2000; pp. 5052-5057.

* cited by examiner

SPHERICALLY SHAPED OPTICAL BEAMSPLITTER

GOVERNMENT INTEREST

The invention described herein may be manufactured, used, and licensed by or for the United States Government without payment therefor.

CROSS-REFERENCE TO RELATED APPLICATION

This application is related to inventor's application titled Cylindrically Shaped Optical Beamsplitter filed on even date.

BACKGROUND OF THE INVENTION

1. Technical Field of the Invention

The invention relates to optical systems and elements. More specifically, the invention relates to an optical beamsplitter that can be used to propagate optical signals.

2. Description of the Related Art

A beamsplitter is an optical device that receives an incident light beam and divides it into two components. The first component is propagated from the beamsplitter as a transmitted beam. The second component is propagated as a reflected beam, angularly displaced with respect to the transmitted beam.

A conventional beamsplitter comprises a cube of optically-transparent material that encases a thin layer of semi-reflecting material oriented diagonally across its interior. Approximately one-half of the light entering one face of the beamsplitter is reflected by the semi-reflecting material through an adjacent face as a reflected light beam. The remaining portion of the light from the incident light is transmitted by the layer of semi-reflecting material through the opposite face as a transmitted light beam.

Beamsplitters are used in optical devices such as in scanners, interferometers and back-scattering detectors for measuring back-scatter from a particle system. One problem associated with conventional cubic beamsplitters is distortion caused by light striking beamsplitter faces at oblique, i.e. non-perpendicular, angles. The transmission through the beamsplitter is refracted according to Fresnel's Equations. The resulting light beam is parallel to the incident beam but displaced from it. The amount of displacement depends on the angle of incidence and the index of refraction of the optical materials used in the beamsplitter. This distortion can be compensated for, to some extent, by repositioning system components.

U.S. Pat. No. 6,414,797 to Gorden Videen discloses a Beamsplitter Prism with Spherical Faces for Transmitting or Reflecting Spherical Waves Without Magnification.

SUMMARY OF THE INVENTION

A spherically shaped optical beamsplitter, system and method are provided. An optical beamsplitter comprises an optically-transparent material and a partially-reflective layer. The optically-transparent material has a unitary spherically shaped exterior surface. The exterior surface is the boundary defining an interior. The partially-reflective layer is positioned in the interior. Means is provided for rotating the spherically shaped optical beamsplitter.

An embodiment of an optical system comprises an optical beamsplitter incorporating an optically-transparent material and a partially-reflective layer. The optically-transparent material has a unitary spherically shaped exterior surface. The exterior surface defines an interior. The partially-reflective layer is positioned at least partially within the interior. The beamsplitter receives incident light and divides the incident light into a first component and a second component. The first component is transmitted from the beamsplitter. The second component is reflected by the partially-reflective layer at an angle relative to the first component and transmitted from the optical beamsplitter.

An embodiment of a method for using an optical beamsplitter comprises the steps of:

i.) providing an optical beamsplitter comprising an optically-transparent material and a partially-reflective layer, the optically-transparent material having a substantially spherically shaped exterior surface, the exterior surface defining an interior, the partially-reflective layer located at least partially within the interior;

ii.) rotating the optical beamsplitter to a first orientation relative to a sample; and iii.) acquiring first information corresponding to the first orientation.

Other devices, systems, methods, features and/or advantages will be apparent to one with skill in the art upon examination of the following drawings and detailed description. It is intended that all such additional devices, systems, methods, features and/or advantages be included within this description.

BRIEF DESCRIPTION OF THE DRAWING

Many aspects of the disclosure can be better understood with reference to the following drawings. Components in the drawings are not necessarily to scale. Like reference numerals designate corresponding parts throughout the several views.

DETAILED DESCRIPTION OF THE INVENTION

As will be described in detail here, spherically shaped optical beamsplitters, systems and methods are provided. The exterior surface of the beamsplitter that directs light is unitary and essentially spherically shaped. As a result; various advantages may be achieved. For example, light incident upon such a beamsplitter can be received at an angle that is normal to the exterior surface of the beamsplitter. Light that is propagated from the beamsplitter can be transmitted at an angle that is normal with respect to the exterior surface. Therefore, at least some of the light received and transmitted can be propagated without distortion.

Figure 1:
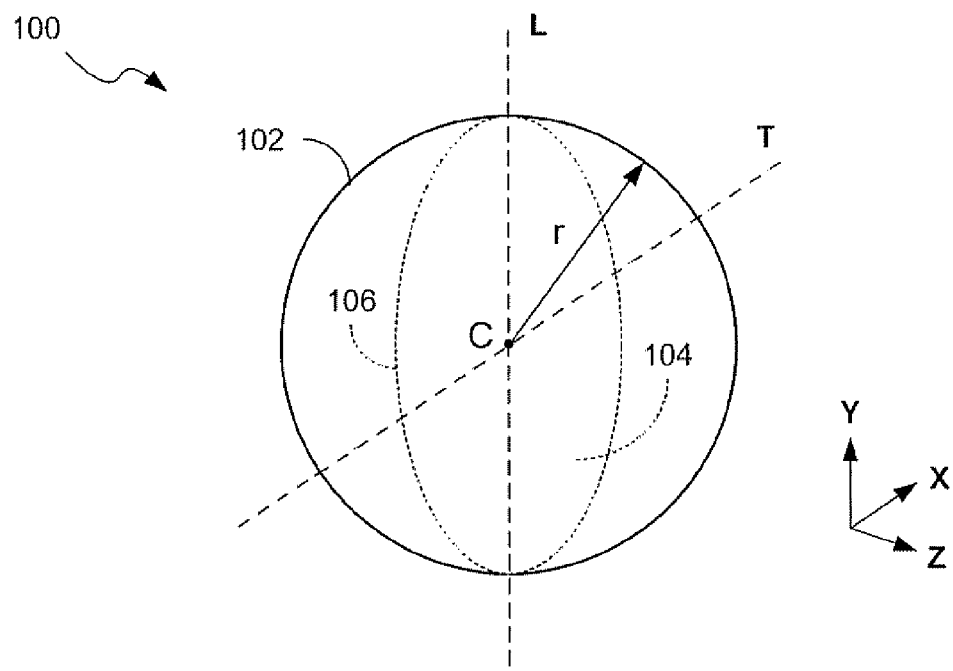
FIG. 1 is a schematic diagram of an embodiment of a spherically shaped optical beamsplitter.

Referring now to the drawing, FIG. 1 is a schematic diagram showing a spherically shaped optical beamsplitter. Beamsplitter 100 is made of a material that is optically transparent with respect to at least one wavelength of light. For example, glass, quartz, plastic and epoxy are optically transparent to visible light. Quartz is transparent to ultraviolet light. Silicon and germanium are transparent to infrared light. The optically-transparent material may be optically transparent with respect to more than one wavelength of light.

The exterior surface 102 of the material is defined by a substantially constant radius r extending from center C. One or more portions of the non-transmitting exterior surface can be other than spherically shaped. For instance, opposing poles of the exterior surface could be flattened to facilitate engagement with a mechanism for rotating the beamsplitter.

Beamsplitter 100 also includes a partially-reflective layer 104 which is oriented generally within a plane that intersects center C. Two orthogonal axes, longitudinal axis L and transverse axis T extend outwardly from center C. In FIG. 1, the L-T plane in which the layer 104 is oriented is parallel to the X-Y plane.

The partially-reflective layer is formed of one or more of various materials known in the art. In FIG. 1, the partially-reflective layer 104 is continuous and extends across the optically-transparent material. The partially-reflective layer 104 extends across the optically-transparent material so that its outer periphery 106 is adjacent to the exterior surface 102. Another embodiment, the partially-reflective layer 104 is discontinuous. The partially-reflective layer 104 may not extend to or in the alternative may extend beyond the exterior surface of the beamsplitter.

Figure 2:
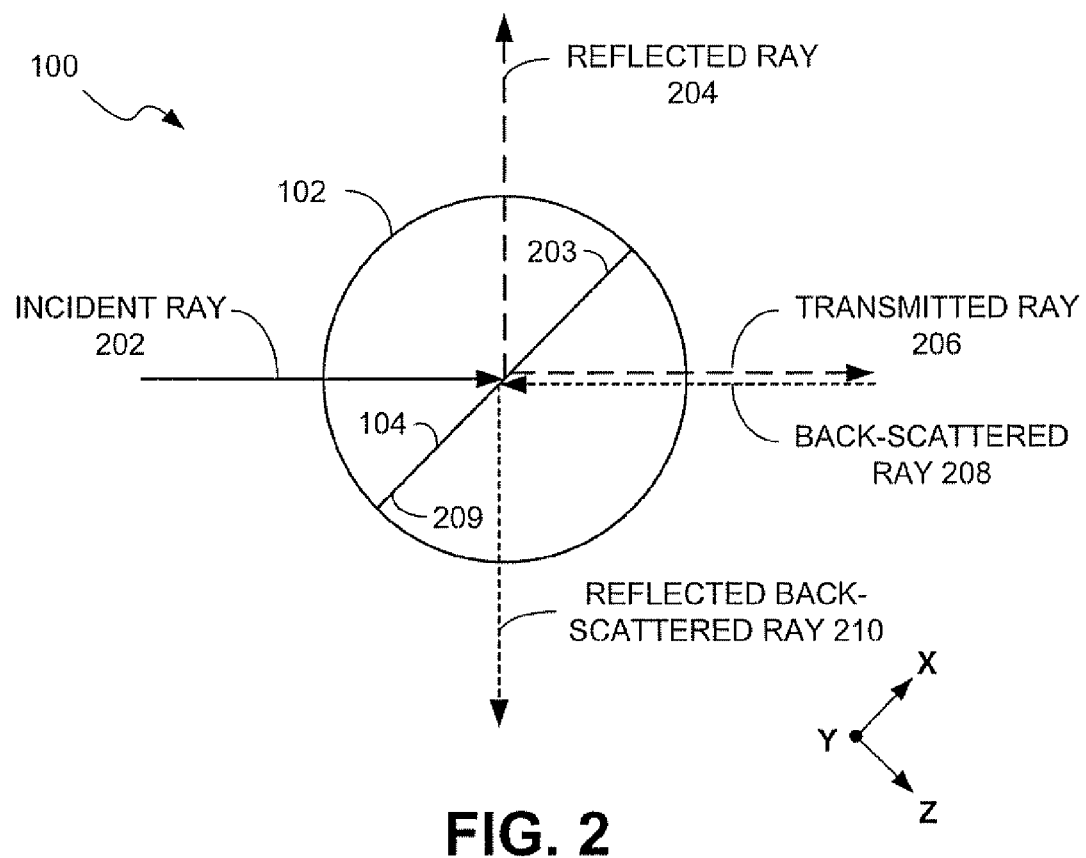
FIG. 2 is a schematic diagram of the embodiment of the beamsplitter of FIG. 1, depicting propagation of an incident ray and a back-scattered ray.

FIG. 2 is a schematic diagram of the beamsplitter of FIG. 1, showing propagation of an incident ray and a back-scattered ray. As shown in FIG. 2, incident ray 202 is received by the beamsplitter 100 and is incident upon partially-reflective layer 104. Face 203 of the partially-reflective layer 104 reflects a first component of the incident ray. This first component is propagated from the beamsplitter as a first reflected ray 204. The remaining portion of the incident ray is propagated through the layer 104 and is transmitted from the beamsplitter as a transmitted ray 206.

In FIG. 2, transmitted ray 206 is incident upon an object not shown) that provides a back-scattered ray 208 to the beamsplitter. Both the transmitted ray 206 and back-scattered ray 208 are shown in FIG. 2 parallel to and laterally offset from each other, for ease of illustration only. In reality, these two rays are co-extensive.

Back-scattered ray 208 is received by the beamsplitter and is incident upon an opposing face 209 of the partially-reflective layer 104. A component of the back-scattered ray 208 is then reflected as a second reflected ray 210 that is propagated from the beamsplitter. Although not shown in FIG. 2, the partially-reflective layer 104 may transmit another component of the back-scattered ray 208. The ray shown in FIG. 2 is normal to the corresponding portion of the exterior surface of the beamsplitter to which it is incident.

Figure 3:
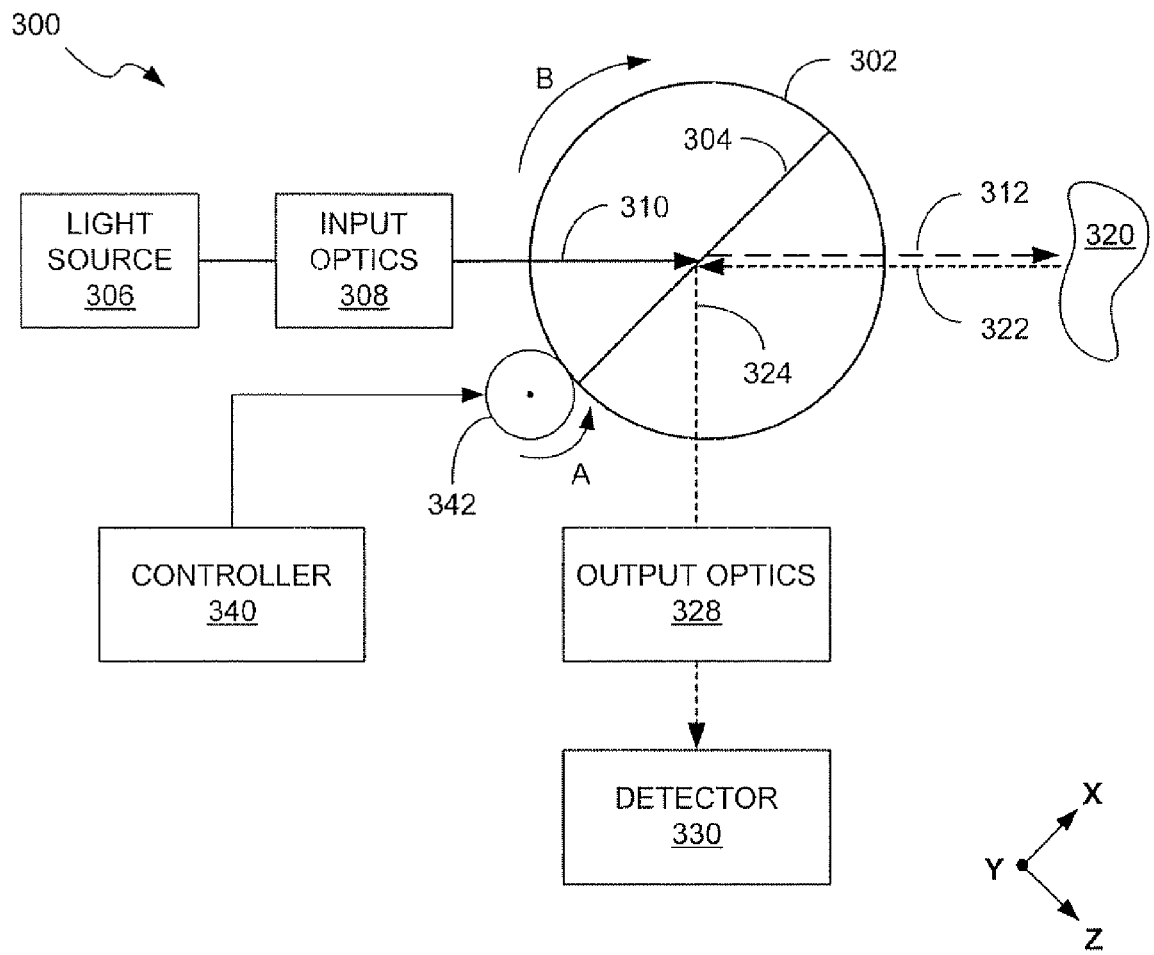
FIG. 3 is an embodiment of an optical system incorporating an embodiment of a spherically shaped optical beamsplitter.

Reference is made to FIG. 3, which shows an optical system including a spherically shaped beamsplitter. Optical system 300 includes a beamsplitter 302 incorporating a partially-reflective layer 304. Light source 306 provides light to optional input optics 308, which focuses light passed to the beamsplitter. The input optics can include a lens.

Light incident upon the beamsplitter, shown as an incident ray 310, is passed through the material of the beamsplitter to the partially-reflective layer 304. A component of the incident ray is transmitted through the beamsplitter as transmitted ray 312. The component of the incident ray that is reflected by the partially-reflective layer is not shown. Transmitted ray 312 is directed toward a sample 320 that scatters incident light. A component of the scattered light comes back to the beamsplitter as back-scattered ray 322. Back-scattered ray 322 is then reflected by the partially-reflective layer 304. Back-scattered reflected ray 324 passes to optional output optics 328, which can include one or more lenses for focusing reflected back-scattered ray 324. The back-scattered reflected ray 324 provided to detector 330 that analyzes the light. For instance, the detector can be an electronic detector such as a photomultiplier tube (PMT), a photodiode (PDA) or a charge-coupled device (CCD), or a non-electronic detector such as photosensitive film or a human eye. The component of the back-scattered ray 322 that is not reflected by partially-reflective layer 304 is not shown in FIG. 3.

Optical system 300 also includes a controller 340 and a rotation mechanism 342 used to rotate beamsplitter 302 with respect to at least one axis of rotation. The rotation mechanism has a surface that contacts the exterior surface of the beamsplitter so that movement of the rotation mechanism rotates the beamsplitter. As shown in FIG. 3, controller 340 provides an input signal to rotation mechanism 342 so that it rotates as indicated by arrow A. In response, beamsplitter 302 rotates as indicated by arrow B. Rotation mechanism can be configured to rotate the beamsplitter with respect to more than one axis. In another embodiment, the beamsplitter can be rotated with the light source.

Another embodiment of the optical system is similar to the arrangement shown in FIG. 3. The position of light source 306 and input optics is exchanged with the position of detector 330 and output optics 328. As beamsplitter 302 is rotated, the incident light from the source scans object 320. The back-scattered light from object 312 is transmitted through the beamsplitter to the output optics and detector.

Figure 4:
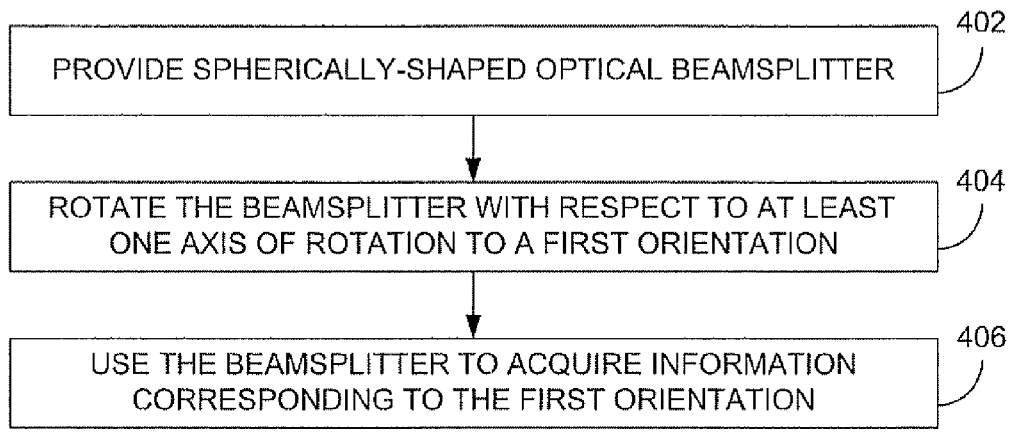
FIG. 4 is a flowchart depicting functionality of the embodiment of the optical system of FIG. 3.

The optical system of FIG. 3 is described with reference to the flowchart of FIG. 4. The method, or functionality, begins at block 402, where a spherically shaped optical beamsplitter is provided. In block 404, the beamsplitter is rotated with respect to at least one axis of rotation to a first orientation. Then in block 406, the beamsplitter is used to acquire information corresponding to the first orientation. When the beamsplitter is used in conjunction with an array of photodiodes, the information can correspond to the intensity of the reflected back-scattered light incident upon the photodiodes during an exposure period.

Figure 5:
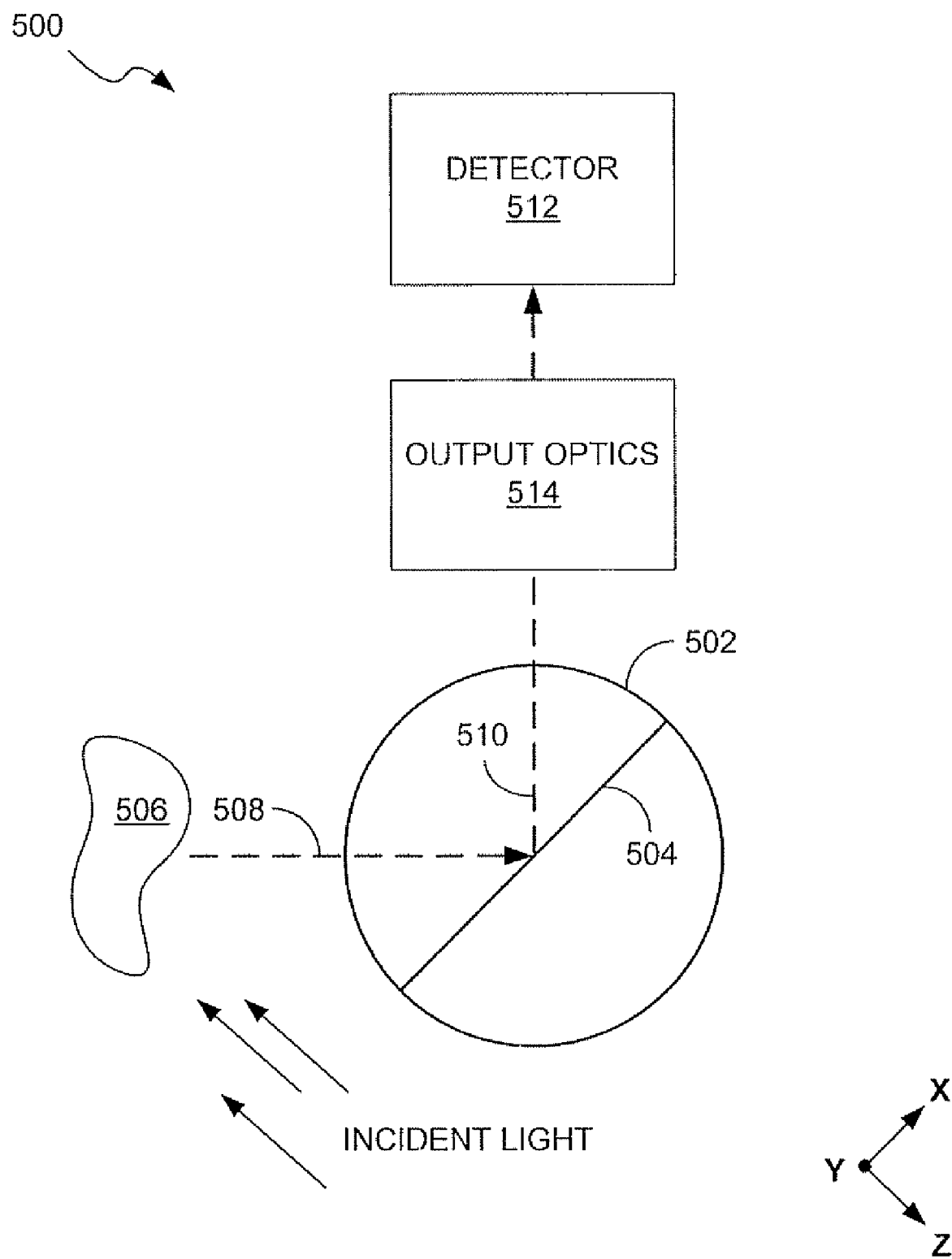
FIG. 5 is a schematic diagram depicting another embodiment of an optical system that incorporates an embodiment of a spherically shaped optical beamsplitter.

Another embodiment of an optical system including a spherically shaped optical beamsplitter is shown in FIG. 5. Optical system 500 includes a beamsplitter 502 incorporating a partially-reflective layer 504. An external light source not shown) illuminates sample 506. A portion of the light provided by the external source is incident upon the sample, with some of the incident light back scattered to the beamsplitter. Scattered ray 508 is propagated from the sample 506 to the beamsplitter 502. Scattered ray 508 is then reflected by the partially-reflective layer 504, with a scattered reflected ray 510 provided to a detector 512 via optional output optics 514.

It should be emphasized that many variations and modifications may be made to the invention. All such modifications and variations are intended to be included within the scope of the following claims.

What is claimed is:

1. An optical system comprising:
   an optical beamsplitter comprising an optically-transparent material and a partially-reflective layer, the optically-transparent material having an essentially spherically shaped exterior surface defining an interior, the partially-reflective layer located within the interior,
   a rotation mechanism having a first surface engaging the optical beamsplitter and operative to rotate the optical beamsplitter, and
   a controller in communication with the rotation mechanism and operative to provide a control input thereto wherein the optical beamsplitter is operative to receive incident light and to divide the incident light into a first component and a second component, the first component transmitted from the beamsplitter and the second component reflected by the partially-reflective layer, at an angle to the first component.

2. The optical system of claim 1, wherein the partially-reflective layer is substantially planar.

3. The optical system of claim 1, wherein the optically transparent material is transparent to visible light.

4. The optical system of claim 1, wherein the optically-transparent material is transparent to more than one wavelength of light.

5. The optical system of claim 1 further comprising:
means for rotating the optical beamsplitter with respect to at least one axis of rotation.

6. The optical system of claim 1, wherein the angle is about 90°.

7. The optical system of claim 1 further comprising:
an optical detector in optical communication with the optical beamsplitter.

8. The optical system of claim 1 further comprising:
input optics in optical communication with the optical beamsplitter and operative to provide focused light to the optical beamsplitter.

9. The optical system of claim 1 further comprising a light source in optical communication with the optical beamsplitter.

10. The optical system of claim 1 further comprising:
output optics in optical communication with the optical beamsplitter and operative to reduce optical distortion.

11. The optical system of claim 1, wherein the essentially spherically shaped exterior surface is a unitary spherical exterior surface.

12. The optical system of claim 11, wherein the partially-reflective layer is substantially planar and intersects a center of the unitary spherical exterior surface.

13. The optical system of claim 1, wherein the essentially spherically shaped exterior surface of the optical beamsplitter comprises a portion that is a non-transmitting surface and that is flattened to facilitate engagement of the optical beamsplitter with the rotation mechanism.

14. The optical system of claim 1, wherein the essentially spherically shaped exterior surface of the optical beamsplitter comprises opposing poles that are flattened to facilitate engagement of the optical beamsplitter with the rotation mechanism.

15. A device comprising the optical system of claim 1.

16. The device of claim 15, wherein the device is selected from the group consisting of scanners, interferometers and back-scattering detectors.

17. The device of claim 16, wherein the device is a back-scattering detector.

* * * * *